US012068520B2

(12) United States Patent
Asahi

(10) Patent No.: US 12,068,520 B2
(45) Date of Patent: Aug. 20, 2024

(54) COAXIAL MICROSTRIP LINE CONVERSION CIRCUIT

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventor: Yasuaki Asahi, Kawasaki (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 332 days.

(21) Appl. No.: 17/623,784

(22) PCT Filed: Apr. 10, 2020

(86) PCT No.: PCT/JP2020/016086
§ 371 (c)(1),
(2) Date: Dec. 29, 2021

(87) PCT Pub. No.: WO2021/002077
PCT Pub. Date: Jan. 7, 2021

(65) Prior Publication Data

US 2022/0247060 A1 Aug. 4, 2022

(30) Foreign Application Priority Data

Jul. 3, 2019 (JP) ................................ 2019-124371

(51) Int. Cl.
*H01P 5/08* (2006.01)
*H01P 3/06* (2006.01)
*H01P 3/08* (2006.01)

(52) U.S. Cl.
CPC ................ *H01P 5/085* (2013.01); *H01P 3/06* (2013.01); *H01P 3/081* (2013.01)

(58) Field of Classification Search
None
See application file for complete search history.

(56) References Cited

U.S. PATENT DOCUMENTS 3,539,966 A * 11/1970 Logan ..................... H01P 5/085 333/260
4,280,112 A * 7/1981 Eisenhart ................ H01P 5/085 333/260

(Continued)

FOREIGN PATENT DOCUMENTS

JP 1-241201 A 9/1989
JP 5-109452 A 4/1993

(Continued)

OTHER PUBLICATIONS

International Preliminary Report on Patentability issued Jan. 6, 2022 in PCT/JP2020/016086 (submitting English translation only), 4 pages.

(Continued)

*Primary Examiner* — Kenneth B Wells
(74) *Attorney, Agent, or Firm* — Maier & Maier, PLLC

(57) ABSTRACT

A coaxial microstrip line conversion circuit includes a housing part including a protrusion protruding into the interior, a microstrip line substrate, a coaxial line including central and ground conductor parts, and a solder layer. The microstrip line substrate includes a microstrip line, a dielectric body having a recess cut into a lower surface, and a ground conductive part bent along the cut surface. The microstrip line substrate is mounted to a bottom surface of the housing part so that the recess and the protrusion fit together. A vertical distance between a lowest position of the ground conductor part facing the central conductor part and (Continued)

a ground surface of the ground conductive part adjacent to the cut surface is less than a vertical distance between the lowest position and a ground surface of the ground conductive part adjacent to a region of the dielectric body where the recess is not provided.

4 Claims, 6 Drawing Sheets

(56) References Cited

U.S. PATENT DOCUMENTS 4,463,324 A * 7/1984 Rolfs ........ H01P 5/103 333/33
4,656,441 A * 4/1987 Takahashi ........ H01P 5/085 333/260
4,669,805 A * 6/1987 Kosugi ........ H01R 24/52 333/260
4,816,791 A * 3/1989 Carnahan ........ H01P 1/047 333/260
4,837,529 A * 6/1989 Gawronski ........ H01P 5/085 333/260
4,995,815 A * 2/1991 Buchanan ........ H01R 9/0515 333/260
5,198,786 A * 3/1993 Russell ........ H01P 5/103 333/246
5,215,477 A * 6/1993 Weber ........ H01R 24/52 439/581
5,402,088 A * 3/1995 Pierro ........ H01P 11/00 333/260
5,418,505 A * 5/1995 Agarwal ........ H01P 5/085 333/33
5,886,590 A * 3/1999 Quan ........ H01P 5/085 333/260
5,963,111 A * 10/1999 Anderson ........ H01P 5/085 333/260
5,982,338 A * 11/1999 Wong ........ H01P 5/08 333/33
6,007,347 A * 12/1999 Keldsen ........ H01R 9/0515 439/63
6,236,287 B1 * 5/2001 Quan ........ H01P 5/085 333/260
6,457,979 B1 * 10/2002 Dove ........ H01R 9/0515 439/63
6,575,762 B2 * 6/2003 Evans ........ H05K 1/0219 439/63
6,774,742 B1 * 8/2004 Fleury ........ H01R 24/52 333/260
6,894,582 B2 * 5/2005 Whybrew ........ H01P 5/085 333/260
7,008,265 B2 * 3/2006 Jonsson ........ H01R 9/0515 439/581
7,029,321 B2 * 4/2006 Sato ........ H01R 24/40 439/516
7,295,084 B2 * 11/2007 Tanbakuchi ........ H01P 1/047 333/260
7,443,272 B2 * 10/2008 Jiang ........ H01P 5/085 333/260
7,471,174 B2 * 12/2008 Hieda ........ H01P 5/00 333/33
7,500,855 B2 * 3/2009 Kari ........ H01R 24/50 439/63
7,665,998 B2 * 2/2010 Kressner ........ H01R 13/6584 439/63
7,750,764 B2 * 7/2010 Snodgrass ........ H01P 5/085 333/260
7,980,893 B2 * 7/2011 Sato ........ H01R 24/50 439/63
8,035,466 B2 * 10/2011 Payne ........ H01P 5/085 333/260
8,152,534 B1 * 4/2012 Li ........ H01R 24/50 439/63
8,350,638 B2 * 1/2013 White ........ H01P 5/028 333/260
8,384,492 B2 * 2/2013 Cheng ........ H01P 5/085 333/260
8,540,523 B2 * 9/2013 Cornic ........ H05K 1/0243 333/260
8,547,184 B2 * 10/2013 Washiro ........ H01Q 9/285 343/803
8,704,725 B2 * 4/2014 Xu ........ H01Q 9/30 343/702
9,054,403 B2 * 6/2015 Blanton ........ H01P 1/047
9,780,431 B2 * 10/2017 Bonczyk ........ H01Q 9/285
9,871,307 B2 * 1/2018 Le Cam ........ H01P 5/085
10,211,506 B2 * 2/2019 Bonczyk ........ H01Q 9/12
10,263,371 B2 * 4/2019 Dejardin ........ H01R 12/57
10,340,233 B1 7/2019 Saiz et al.
10,522,894 B2 * 12/2019 Nishihara ........ H01P 3/081
10,709,011 B2 * 7/2020 Trulli ........ H01R 9/0515
10,797,414 B2 * 10/2020 Heilemann ........ H05K 3/34
10,811,756 B2 * 10/2020 Li ........ H01P 5/085
10,879,654 B2 * 12/2020 Graßl ........ H01R 24/44
10,892,535 B2 * 1/2021 Li ........ H01P 3/081

FOREIGN PATENT DOCUMENTS

JP 5-235613 A 9/1993
JP 2003-68905 A 3/2003
JP 2010-192987 A 9/2010

OTHER PUBLICATIONS

International Search Report issued on Jul. 7, 2020 in PCT/JP2020/016086 filed on Apr. 10, 2020, 2 pages.

* cited by examiner

COAXIAL MICROSTRIP LINE CONVERSION CIRCUIT

TECHNICAL FIELD

Embodiments of the invention relate to a coaxial microstrip line conversion circuit.

BACKGROUND ART

When a coaxial line and a microstrip line are connected, high frequency signals are reflected because the propagation mode is discontinuous.

For example, the discontinuity of the propagation mode increases when the distance in the vertical plane between the ground outer conductor part of the coaxial line and the back surface ground conductive part of the microstrip line substrate increases. Also, such an effect increases as the signal frequency increases.

PRIOR ART DOCUMENTS

Patent Literature

[Patent Literature 1]
Japanese Patent Application 2010-192987 (Kokai)

SUMMARY OF INVENTION

Technical Problem

To provide a coaxial microstrip line conversion circuit in which reflections of high frequency signals of not less than several GHz can be reduced.

Solution to Problem

A coaxial microstrip line conversion circuit of an embodiment includes a housing part, a microstrip line substrate, a coaxial line, and a solder layer. The housing part includes a bottom surface, and a first side surface in which an opening is provided. The bottom surface includes a protrusion protruding upward. The microstrip line substrate includes a dielectric body, a microstrip line provided at the upper surface of the dielectric body, and a ground conductive part provided at the lower surface of the dielectric body. The coaxial line includes a central conductor part that is mounted to the first side surface and includes one end portion extending in a horizontal direction through the opening toward an interior of the housing, and a ground conductor part that includes an inner surface facing the central conductor part. The solder layer bonds the one end portion of the central conductor part and one end portion of the microstrip line. A recess is provided in the lower surface of the dielectric body by cutting a prescribed region at the side adjacent to the protrusion; and the ground conductive part is provided to be bent at the cut surface. The microstrip line substrate is mounted to the bottom surface of the housing part so that the recess and the protrusion fit together with the ground conductive part interposed. A vertical distance between a ground surface of the ground conductive part adjacent to the cut surface and a lowest position of the inner surface of the ground conductor part in a vertical cross section including a center line of the central conductor part is less than a vertical distance between the lowest position and a ground surface of the ground conductive part adjacent to a region of the lower surface of the dielectric body at which the recess is not provided.

DESCRIPTION OF EMBODIMENTS

Embodiments of the invention will now be described with reference to the drawings.

Figure 1:
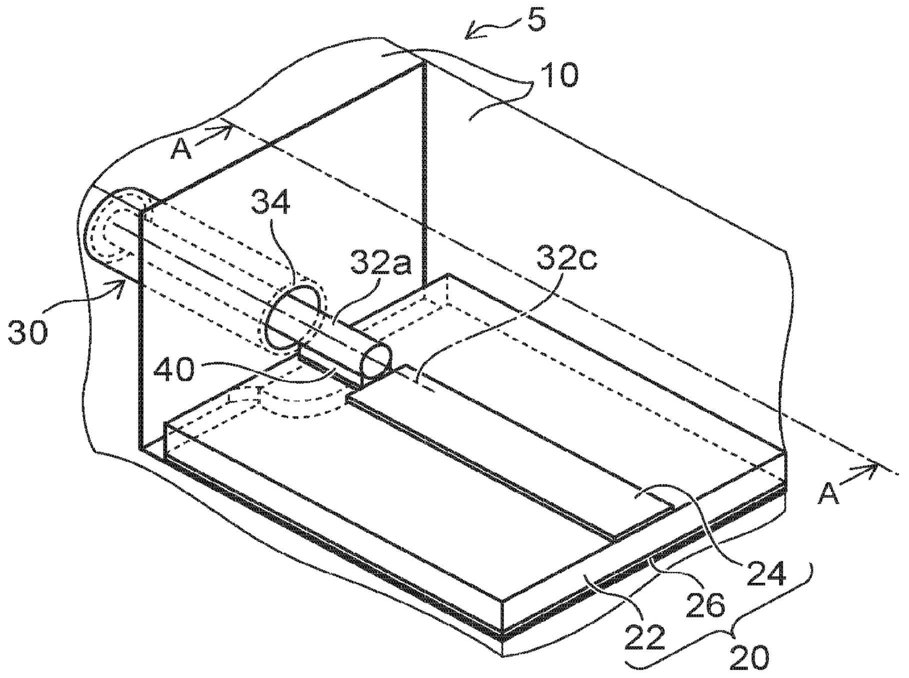
FIG. 1 is a partial schematic perspective view of a coaxial microstrip line conversion circuit according to a first embodiment.
Figure 2A:
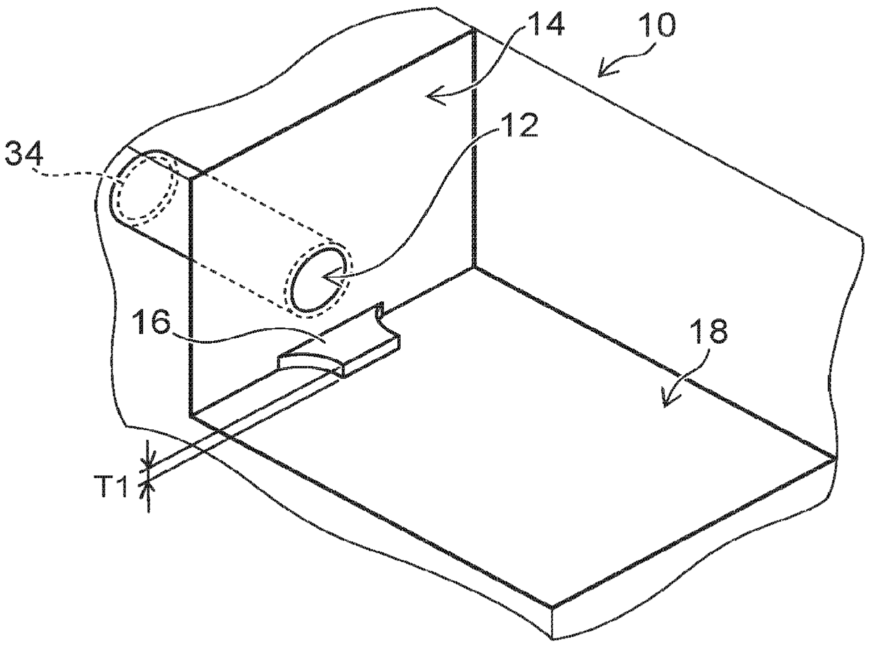
FIG. 2 is a partial schematic view of a housing part of the coaxial microstrip line conversion circuit according to the first embodiment.
Figure 2B:
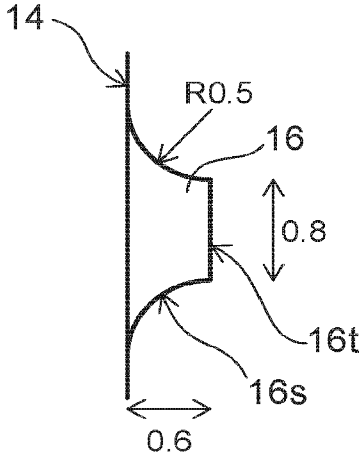
Figure 3A:
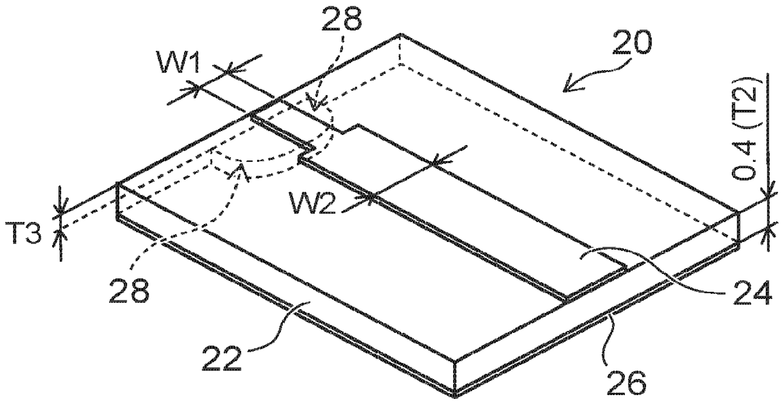
FIG. 3 is a schematic view of the microstrip line substrate of the coaxial microstrip line conversion circuit according to the first embodiment.
Figure 3B:
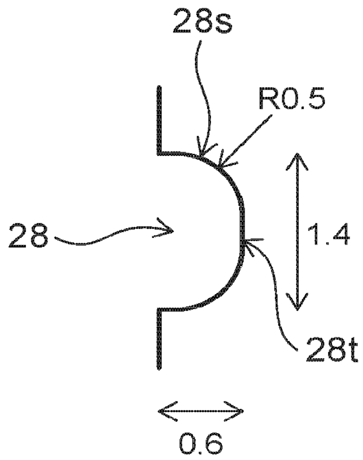

FIG. 1 is a partial schematic perspective view of a coaxial microstrip line conversion circuit according to a first embodiment. FIGS. 2A and 2B are a partial schematic perspective view and a schematic plan view of a housing part of the coaxial microstrip line conversion circuit. FIGS. 3A and 3B are a schematic perspective view and a schematic plan view of a microstrip line substrate of the coaxial microstrip line conversion circuit.

As illustrated in FIG. 1, the coaxial microstrip line conversion circuit 5 includes a housing part 10, a microstrip line substrate 20, a coaxial line 30, and a solder layer 40.

As illustrated in FIG. 2A, the housing part 10 includes a bottom surface 18, and a first side surface 14 in which an opening 12 is provided. The bottom surface 18 includes a protrusion 16 that protrudes toward the top of the housing part 10 and contacts the back surface of the microstrip line substrate 20. The thickness of the protrusion 16 is taken as T1. The housing part 10 can be, for example, an aluminum alloy, etc.

FIG. 2B is a schematic plan view showing the upper surface of the protrusion 16. The upper surface of the protrusion 16 has a substantially trapezoidal shape; and the protrusion 16 includes a side surface 16*s*, and a side surface 16*t* that is parallel to the first side surface 14. The side surface 16*s* links the first side surface 14 and the side surface 16*t*. The side surface 16*s* is a curved surface that has, for example, an R of 0.5 mm. The distance from the first side surface 14 to the side surface 16$t$ is, for example, 0.6 mm. Also, the length of the side surface 16$t$ in a direction along the first side surface 14 is, for example, 0.8 mm.

As shown in FIGS. 1 and 2A, the coaxial line 30 includes a circular columnar central conductor part 32 mounted to the first side surface 14, and a ground conductor part 34 that is disposed in a concentric circular configuration and includes an inner surface facing the central conductor part 32. One end portion 32$a$ of the central conductor part 32 extends through the opening 12 into the housing part 10. A space between the central conductor part 32 and the ground conductor part 34 is filled with a dielectric body (having a relative dielectric constant $\varepsilon_r$). The dielectric body in these drawings is taken to be air ($\varepsilon_r$=1), but the invention is not limited thereto.

As illustrated in FIG. 3A, the microstrip line substrate 20 includes a dielectric body 22, a microstrip line 24 provided at the upper surface of the dielectric body 22, and a ground conductive part 26 provided at the lower surface of the dielectric body 22. The thickness of the dielectric body 22 is taken as T2. The material of the dielectric body 22 can be, for example, a low dielectric constant glass cloth, etc. Also, the microstrip line 24 and the ground conductive part 26 can be, for example, Cu foils having thicknesses of 20 μm, etc.

The solder layer 40 bonds the one end portion 32$a$ of the central conductor part 32 and one end portion of the microstrip line 24.

A recess 28 is provided in the lower surface of the dielectric body 22 by cutting a prescribed region at the side adjacent to the protrusion 16; and a portion of the ground conductive part 26 is provided to be bent at the cut surface. The thickness of the dielectric body 22 at the thinned region is taken as T3. The microstrip line substrate 20 is fixed to the bottom surface 18 of the housing part 10 by using, for example, screws, etc., so that the recess 28 and the protrusion 16 fit together.

A line width W1 of the microstrip line 24 at the side opposite to the recess 28 is set to be less than a line width W2 of the microstrip line 24 at the region of the dielectric body 22 at which the recess 28 is not provided. The line widths W1 and W2 can be determined to provide the prescribed characteristic impedance (e.g., 50Ω).

FIG. 3B is a schematic plan view showing the recess 28. FIG. 3B illustrates a cross section parallel to the upper surface of the dielectric body 22.

As shown in FIG. 3B, the recess 28 includes a side surface 28$s$ and a side surface 28$t$. The side surface 28$t$ is parallel to the outer side surface of the dielectric body 22; and the side surface 28$s$ links the side surface 28$t$ and the outer side surface of the dielectric body 22. The side surface 28$s$ is a curved surface having, for example, an R of 0.5 mm.

For example, the recess 28 has an opening width of 1.4 mm in a direction parallel to the outer side surface of the dielectric body 22. Also, for example, the recess 28 has a depth of 0.6 mm in a direction perpendicular to the outer side surface of the dielectric body 22.

Figure 4:
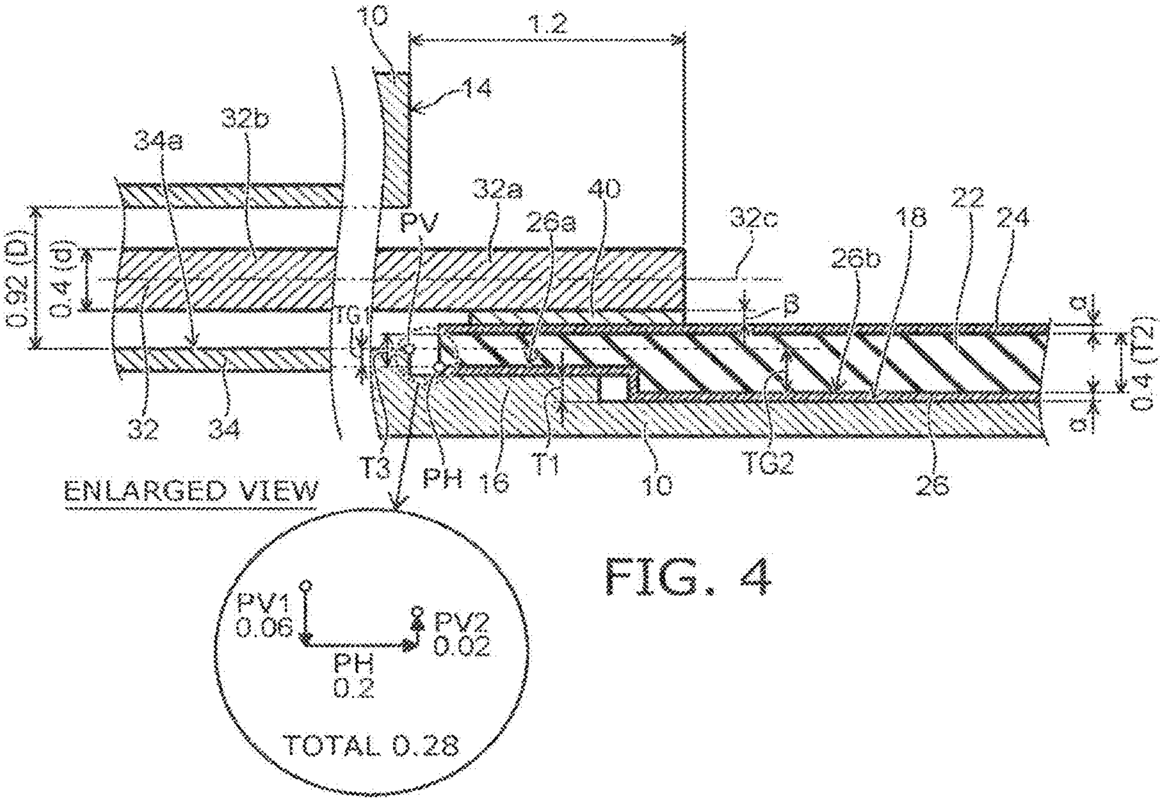
FIG. 4 is a schematic cross-sectional view along line A-A of the first embodiment.

FIG. 4 is a schematic cross-sectional view along line A-A of the first embodiment.

In a vertical cross section including a center line 32$c$ of the central conductor part 32, a vertical distance TG1 is set to be less than a vertical distance TG2. The vertical distance TG1 is between a ground surface 26$a$ of the ground conductive part 26 adjacent to the cut surface and a lowest position 34$a$ of the inner surface of the ground conductor part 34 facing the central conductor part 32. The vertical distance TG2 is between the lowest position 34$a$ and a ground surface 26$b$ of the ground conductive part 26 adjacent to a region of the lower surface of the dielectric body 22 at which the recess 28 is not provided.

In the coaxial line 30, the diameter of the central conductor part 32 is taken as d (mm); and the diameter of the inner surface of the ground conductor part 34 is taken as D (mm). A characteristic impedance $Z_0$ of the coaxial line 30 is represented by Formula (1), in which $\varepsilon_r$ is the relative dielectric constant.

$$Z_0 = \frac{138.1}{\sqrt{\varepsilon_r}} \log \frac{D}{d} \qquad \text{[Formula 1]}$$

The characteristic impedance $Z_0$ is 50Ω for a hollow coaxial line for which the relative dielectric constant $\varepsilon_r$=1.

Also, a cutoff frequency $f_c$ of the coaxial line 30 is represented by Formula (2), in which c is the speed of light (=$3\times10^{11}$ mm/s), and π is pi.

$$f_c = \frac{2c}{\pi\sqrt{\varepsilon_r}\,(D+d)} \qquad \text{[Formula 2]}$$

When D=0.92 mm, d=0.4 mm, and the relative dielectric constant $\varepsilon_r$=1, the cutoff frequency $f_c$ can be sufficiently high, i.e., about 145 GHz. On the other hand, for example, when D=3 mm, d=1.07 mm, and $\varepsilon_r$=1.52, the high frequency propagation characteristics degrade because the cutoff frequency $f_c$ degrades to about 38.1 GHz.

According to the first embodiment, the discontinuity of the propagation mode is reduced by reducing the vertical distance TG1 between the lowest position 34$a$ in the vertical cross section of the ground conductor part 34 of the coaxial line 30 and the ground surface 26$a$ of the ground conductive part 26 of the microstrip line substrate 20 at which the recess 28 is provided.

For example, when setting D=0.92 mm, d=0.4 mm, and the like to increase the cutoff frequency $f_c$, the distance (the spacing) between the ground conductor part 34 and the central conductor part 32 of the coaxial line 30 becomes small, i.e., 0.26 mm. When the dielectric body 22 is made thin accordingly, warp easily occurs in the microstrip line substrate 20 when fixing to the bottom surface 18 of the housing part 10. According to the first embodiment, the warp of the dielectric body 22 is suppressed by reducing the thickness T2 of the microstrip line substrate 20 only at the vicinity of the connection position between the coaxial line 30 and the microstrip line substrate 20. In other words, it becomes easy to make the distance between the central conductor part 32 and the ground conductor part 34 less than the thickness of the region of the dielectric body 22 at which the recess 28 is not provided (0.4 mm).

Also, the thickness of the ground conductive part 26 and the thickness of the microstrip line 24 each are taken as a. Furthermore, the vertical distance between the stripe-shaped conductive part 24 and the lower end of the central conductor part 32 is taken as β. The ground conductive part 26 and the microstrip line 24 can include, for example, Cu foils.

Here, a first specific example of the first embodiment will be described. T3=0.2 mm and α=0.02 mm are set. To set vertical distance TG1=0, it is sufficient to set T1=0.2 mm and β=0.04 mm. Also, as a second specific example, T1=0.2 mm and β=0.08 mm are set, and the vertical distance TG1 is equal to 0.04 mm when providing the microstrip line substrate 20 lower by cutting the bottom surface 18 of the housing part 10.

In the second specific example, the total separation distance is 0.28 mm, i.e., includes 0.06 mm perpendicularly downward, 0.2 mm in the horizontal direction and 0.02 mm perpendicularly upward between a grounding point PV and a grounding point PH. The grounding point PV is provided at the lowest position 34*a* in the end portion of the inner surface of the ground conductor part 34 in the end portion of the coaxial line 30. The grounding point PH is provided at the end portion of the ground surface 26*a* (at the grounding point PV side) in the ground conductive part 26 of the microstrip line 20. In other words, when the vertical distance TG1 is nonzero but is, for example, within a range of about plus or minus 0.05 mm, the vertical distance TG1 between the lowest position 34*a* of the ground conductor part 34 of the coaxial line 30 and the ground surface 26*a* of the ground conductor part 26 of the microstrip line substrate 20 can be reduced, and the distance between the grounding point PH and the grounding point PV can be small, i.e., 0.28 mm, etc. Therefore, the discontinuity of the propagation mode in the coaxial microstrip line conversion circuit can be suppressed.

Figure 5:
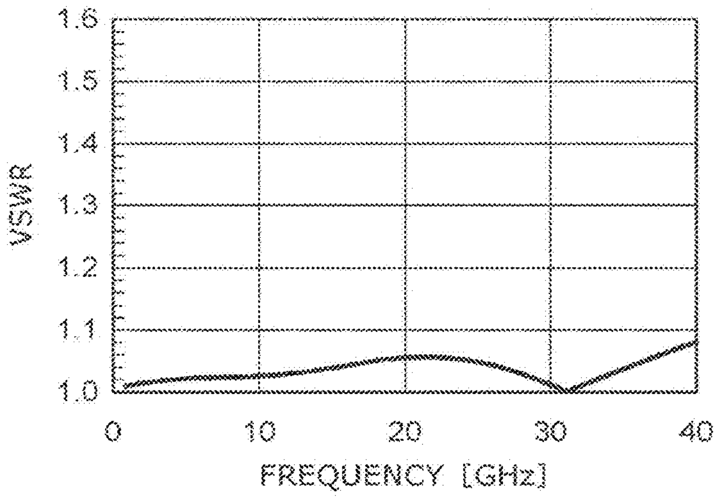
FIG. 5 is a graph illustrating a frequency characteristic of an electromagnetic field simulation of the voltage standing wave ratio of the coaxial microstrip line conversion circuit according to the first embodiment.

FIG. 5 is a graph illustrating a frequency characteristic of the voltage standing wave ratio, by an electromagnetic field simulation, in the coaxial microstrip conversion circuit according to the second specific example of the first embodiment.

The vertical axis is the voltage standing wave ratio (VSWR: Voltage Standing Wave Ratio), and the horizontal axis is the frequency (GHz). For example, the microstrip line 24 is terminated with a 50Ω load; and the load impedance viewed from the coaxial line 30 is measured. The voltage standing wave ratio VSWR is low and is maintained within about 1.08 up to a frequency of 40 GHz.

Figure 6A:
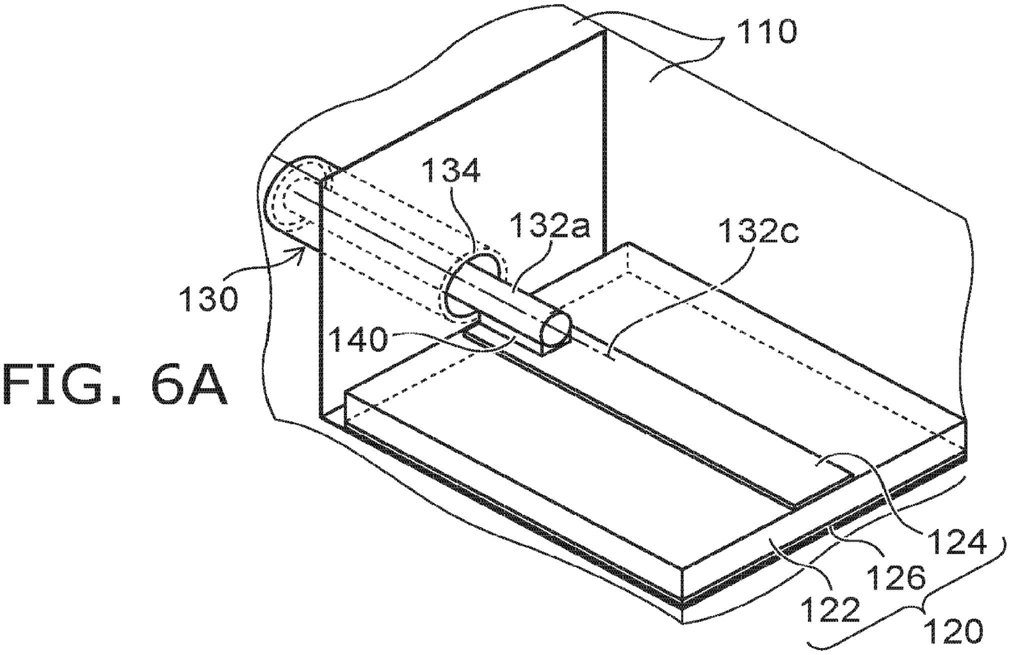
FIG. 6A is a partial schematic perspective view of a coaxial microstrip line conversion circuit according to a comparative example.
Figure 6B:
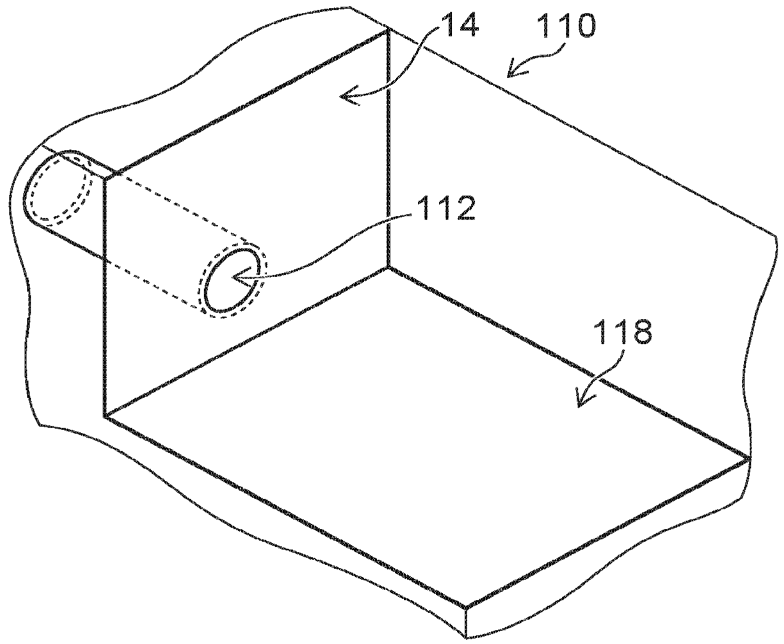
FIG. 6B is a partial schematic perspective view of the housing part of the coaxial microstrip line conversion circuit.
Figure 6C:
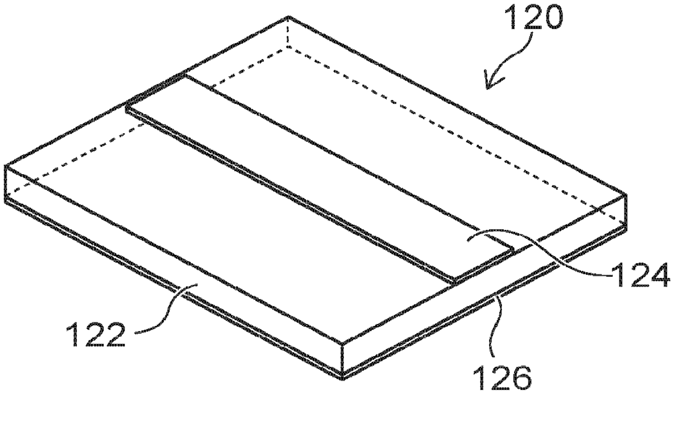
FIG. 6C is a schematic perspective view of the microstrip line substrate of the coaxial microstrip line conversion circuit.

FIG. 6A is a schematic perspective view of a coaxial microstrip line conversion circuit according to a comparative example; FIG. 6B is a schematic perspective view of a housing part of the coaxial microstrip line conversion circuit; and FIG. 6C is a schematic perspective view of the microstrip line substrate of the coaxial microstrip line conversion circuit.

The size and the structure of the coaxial line 130 are similar to those of the first embodiment. A recess is not provided in the backside of a microstrip line substrate 120; and the thickness of a dielectric body 112 is set to 0.4 mm. Also, the microstrip line substrate 120 is mounted to the surface of a bottom surface 118 of a flat housing part 110.

Figure 7:
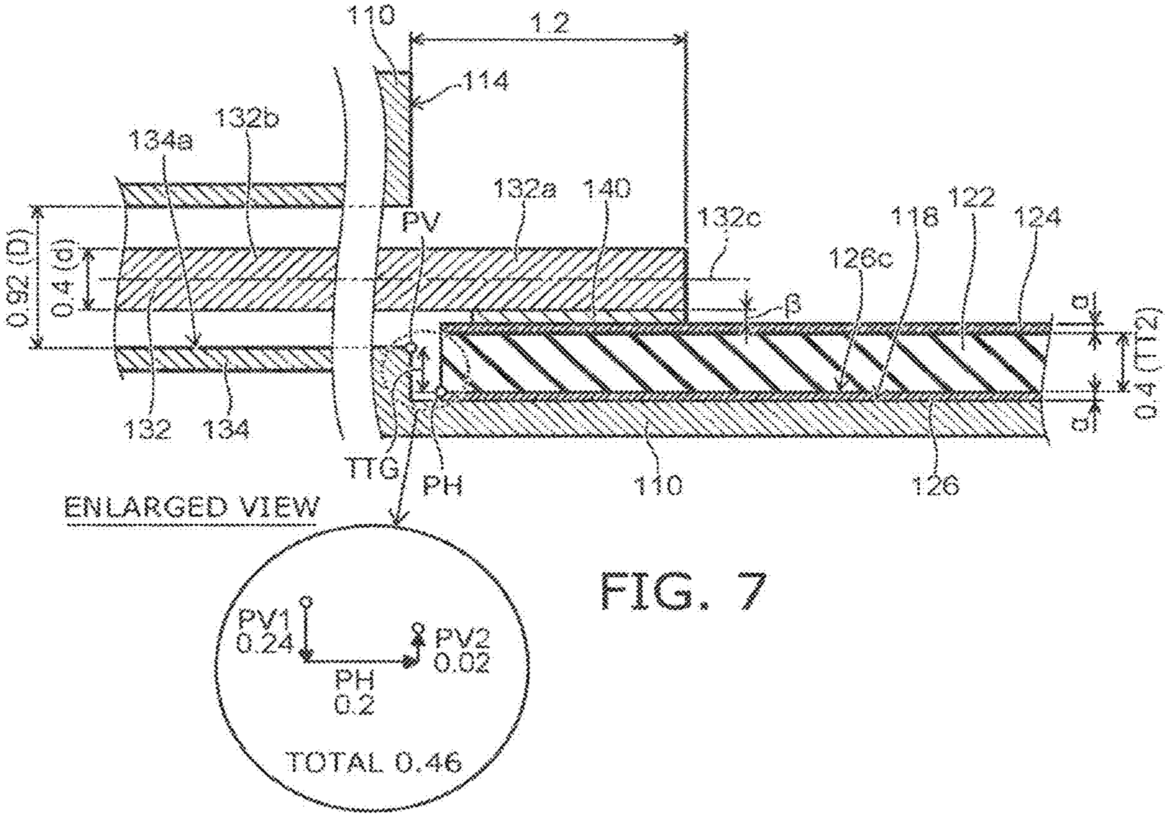
FIG. 7 is a schematic cross-sectional view along line A-A of the comparative example.

FIG. 7 is a schematic cross-sectional view along line A-A of the comparative example.

The thickness of a ground conductive part 126 and the thickness of a microstrip line 124 are taken as α; α is set to 0.02 mm; the vertical distance between the microstrip line 124 and the lower end of a central conductor part 132 is taken as β; and the value of β is set to 0.06 mm. A vertical distance TTG between a lowest position 134*a* of a ground conductor part 134 of the coaxial line 130 and a ground surface 126*c* of the ground conductor part 126 of the microstrip line substrate 120 is 0.22 mm.

In such a case, the total separation distance is large, i.e., 0.46 mm, i.e., includes 0.24 mm perpendicularly downward, 0.2 mm in the horizontal direction, and 0.02 mm perpendicularly upward between the grounding point PV and the grounding point PH. The grounding point PV is provided at the lowest position 134*a* in the end portion of the inner surface of the ground conductor part 134 in the coaxial line 130. The grounding point PH is provided at the end portion of the ground conductive part 126 (at the grounding point PV side) in the microstrip line substrate. That is, the distance between the central conductor part 132 and the ground conductor part 134 is 0.26 mm, but the thickness of the microstrip line substrate 120 is large, i.e., 0.4 mm; therefore, it is difficult to provide the vertical distance TTG close to zero; and the distance between the grounding points PV and PH increases to 0.46 mm. Thus, the discontinuity of the propagation mode at the vicinity of the connection region increases, and the reflections of the high frequency signals increase.

Figure 8:
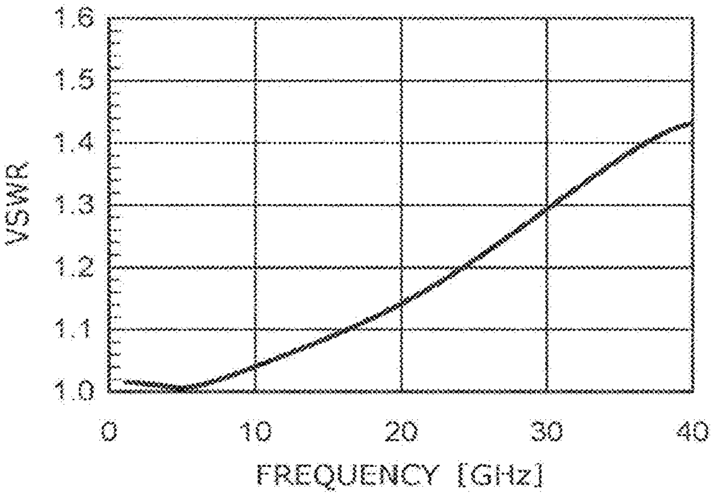
FIG. 8 is a graph of a frequency characteristic of an electromagnetic field simulation of the voltage standing wave ratio of the coaxial microstrip line conversion circuit according to the comparative example.

FIG. 8 is a graph of a frequency characteristic of the voltage standing wave ratio, by an electromagnetic field simulation, in the coaxial microstrip line conversion circuit according to the comparative example.

The voltage standing wave ratio VSWR is about 1.2 at 24 GHz, and degrades to about 1.43 at 40 GHz.

In contrast, according to the first embodiment, the protrusion 16 that has the thickness T1 is provided and fits together with the microstrip line substrate 20 in which the recess 28 is provided. As a result, the vertical distance TG1 between the lowest position 34*a* of the ground conductor part 34 of the coaxial line 30 and the ground surface 26*a* of the ground conductor part 26 of the microstrip line substrate 20 can approach zero.

A third specific example of the first embodiment will now be described. When several tens of μm of a copper plating layer and/or a Au flash layer are provided at the surfaces of the microstrip line 24 and the ground conductive part 26 of the microstrip line substrate 20, the ground surface 26*a* moves to be lower than the lowest position 34*a* of the ground conductor part 34 of the coaxial line 30. In such a case, for example, the increased portions of the thicknesses of the conductive layers can be canceled by reducing the thickness T2 or the thinned thickness T3 of the dielectric body 22; and a small vertical distance TG1 can be maintained.

A portion of the coaxial line 30 may include a SMP-compatible connector mounted to the first side surface 14 of the housing part 10.

According to the embodiment, a coaxial microstrip line conversion circuit is provided in which the reflections of high frequency signals of not less than several GHz can be reduced. The coaxial microstrip line conversion circuit can be widely used in communication devices from the microwave band to the millimeter-wave band.

While certain embodiments of the inventions have been described, these embodiments have been presented by way of example only, and are not intended to limit the scope of the inventions. These novel embodiments may be embodied in a variety of other forms; and various omissions, substitutions, and changes may be made without departing from the spirit of the inventions. Such embodiments and their modifications also are included in the scope and spirit of the inventions, and are within the scope of the inventions described in the claims and their equivalents.

REFERENCE NUMERAL LIST

10 housing part
12 opening
14 first side surface
16 protrusion
18 bottom surface
20 microstrip line substrate
22 dielectric body
24 microstrip line
26 ground conductive part

28 recess
30 coaxial line
32 central conductor part
32*a* one end portion
32*c* center line
34 ground conductor part
34*a* lowest position of ground conductor part
40 solder layer
T1 thickness of protrusion
T2 thickness of dielectric body
T3 thickness of dielectric substrate after cutting

The invention claimed is:

1. A coaxial microstrip line conversion circuit, comprising:

a housing part including a first side surface and a bottom surface, an opening being provided in the first side surface, the bottom surface including a protrusion protruding upward;

a microstrip line substrate provided on the bottom surface of the housing part, the microstrip line substrate including:

a dielectric body, a microstrip line provided at an upper surface of the dielectric body, and a ground conductive part provided at a lower surface of the dielectric body, the dielectric body including a recess at the lower surface, the protrusion of the housing part being fitted in the recess, the ground conductive part extending along an inner surface of the recess and being provided between the protrusion and the dielectric body;

a coaxial line including a central conductor part and a ground conductor part, the central conductor part being provided to be adjacent to the first side surface, one end portion of the central conductor part extending in a horizontal direction through the opening toward an interior of the housing part, the central conductor part extending above the protrusion of the housing part, the microstrip line substrate including a portion provided between the protrusion and the central conductor part, one end portion of the microstrip line being positioned between the protrusion and the central conductor part, the ground conductor part including an inner surface facing the central conductor part; and a solder layer bonding the one end portion of the central conductor part and the one end portion of the microstrip line, the solder layer being provided between the protrusion of the housing part and the central conductor part of the coaxial line, in a vertical cross section including a center line of the central conductor part, a vertical distance between a lowest position of the inner surface of the ground conductor part of the coaxial line and the ground conductive part provided in the recess of the dielectric body of the microstrip line substrate being less than a vertical distance between the lowest position of the inner surface of the ground conductor part of the coaxial line and the ground conductive part provided in a region of the lower surface of the dielectric body of the microstrip line substrate, the recess being not provided in the region of the lower surface of the dielectric body.

2. The coaxial microstrip line conversion circuit according to claim 1, wherein a distance between the central conductor part and the ground conductor part is less than a thickness of the region of the dielectric body at which the recess is not provided.

3. The coaxial microstrip line conversion circuit according to claim 1, wherein a line width of the microstrip line at a side opposite to the recess is less than a line width of the microstrip line at the region at which the recess is not provided.

4. The coaxial microstrip line conversion circuit according to claim 2, wherein a line width of the microstrip line at a side opposite to the recess is less than a line width of the microstrip line at the region at which the recess is not provided.

* * * * *